United States Patent [19]

Flora

[11] 4,271,526
[45] Jun. 2, 1981

[54] THREE-LEVEL, SELF-CLOCKED DATA TRANSMISSION SYSTEM

[75] Inventor: Laurence P. Flora, Covina, Calif.

[73] Assignee: Burroughs Corporation, Detroit, Mich.

[21] Appl. No.: 45,805

[22] Filed: Jun. 5, 1979

Related U.S. Application Data

[62] Division of Ser. No. 16,976, Mar. 2, 1979.

[51] Int. Cl.³ .................. H04L 25/40; H04L 3/00
[52] U.S. Cl. ................................. 375/17; 178/66.1; 375/20
[58] Field of Search .............. 375/17, 20; 178/68

[56] References Cited

U.S. PATENT DOCUMENTS 4,083,005  4/1978  Looschen ........................ 375/17

Primary Examiner—Harold I. Pitts
Attorney, Agent, or Firm—Nathan Cass; Kevin R. Peterson; David G. Rasmussen

[57] ABSTRACT

A serial digital data transmission system wherein pairs of binary input signals are encoded into a self-clocked three-level signal having high, low and intermediate levels for driving over a transmission line with level transitions occurring in response to an applied clock signal, and with a valid signal being employed to indicate data presence. Selectable encoding is provided in response to detecting any accumulated excess of high or low prior transmission levels so as to continually seek maintenance of an intermediate average level for the transmitted signal. The clock and valid signals are regenerated at the receiver for use in deriving the binary signal data from the received three-level signal.

8 Claims, 12 Drawing Figures

4,271,526

THREE-LEVEL, SELF-CLOCKED DATA TRANSMISSION SYSTEM

This is a division of application Ser. No. 16,976, filed Mar. 2, 1979.

BACKGROUND OF THE INVENTION

This invention relates generally to improved serial digital transmission means and methods, and more particularly to improved means and methods useful for providing reliable, high speed communication of digital data between units in a digital data processing system.

Modern data processing systems have a number of different units between which binary digital data must be communicated economically at high speed and over long distances. The problems associated with a system to satisfy the above requirements are to transmit data over one transmission medium with only one transition per bit and with a clock imbedded in the data. In addition, it is often a requirement to provide means for non-continuous operation so that data transmission may be started and stopped. In addition to direct coupling, it is advantageous to have the capability to transmit the data with no long term DC component in the transmitted waveform so that transformer isolation may be used at the ends of the transmission line to electrically isolate separated units which are likely to have different ground potentials.

Although a variety of approaches and circuitry are known in the art for implementing a serial digital data transmission system, most prior art will solve certain ones but not all of the aforementioned problems. Methods which are theoretically capable of solving all of the above problems involve complicated coding schemes and require considerable logic circuitry for implementation of coding and decoding, or require burst methods with start and stop bits which reduces the overall bit transfer rate.

SUMMARY OF THE PRESENT INVENTION

In accordance with the present invention, improved means and methods are provided for implementing a serial digital data transmission system in a manner which solves all the aforementioned problems associated with the performance requirements of modern day data processing systems.

In a particular preferred embodiment incorporating the invention, the binary data to be transmitted is encoded into a 3-level signal having only one transition per bit with clock imbedded in the data. The system provides for either continuous or non-continuous transmission of data.

An improved encoding means uses a 2-bit encoding method wherein two sequential digital bit signals to be transmitted may be represented by a choice of codes of two transmitted voltage levels, one code having a high average level, another having a low average level and a third having an intermediate average level.

An excess voltage detector measures the accumulated excess signal polarity of prior transmitted levels for a high, low or intermediate average. A choice is made as to which code to transmit to represent two sequential digital bit signals so that an intermediate average level is maintained on the transmission line. Improved 3-level decoding means are also provided for the received 3-level signal.

The specific nature of the invention as well as other objects, features, advantages and uses thereof will become readily apparent from the following description of a preferred embodiment of the invention taken in conjunction with the accompanying drawings.

DETAILED DESCRIPTION

Figure 1:
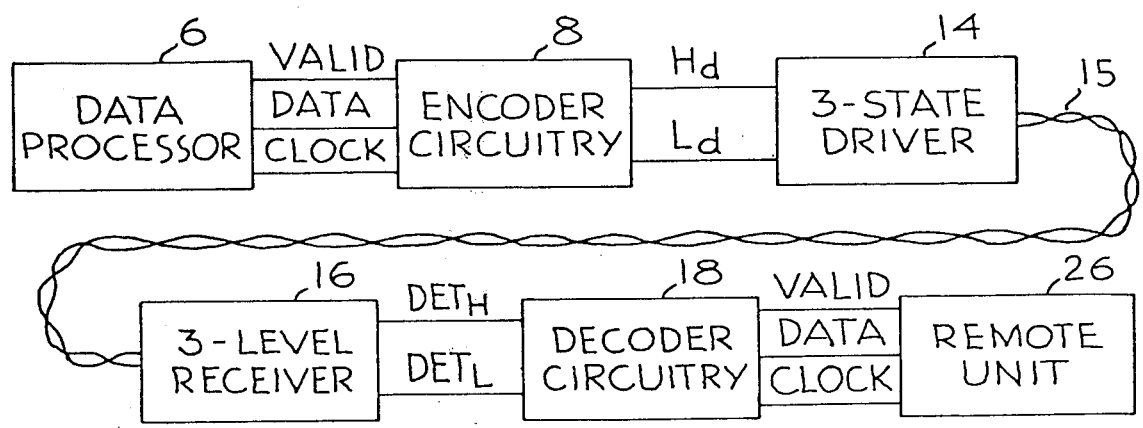
FIG. 1 is an overall block diagram illustrating a preferred embodiment of a serial digital data transmission system in accordance with the invention.

An overall block diagram of a preferred embodiment of a serial digital data transmission system in accordance with the invention is illustrated in FIG. 1. The encoder circuitry 8 together with the 3-state driver 14 comprise the transmitter section of the improved data transmission system. The receiver of the data transmission system comprises the 3-level receiver 16 and the decoder circuitry 18. As shown, sequential binary input data signals to be transmitted are applied to encoder circuitry 8 along with a clock and a valid signal. The data, clock and valid signals are applied from sources within a computer or data processing system 6 with which the illustrated serial data transmission system operates for transmitting data from data processor 6 to a remote unit 26. Data is transmitted from the 3-state driver 14 to the 3-level receiver 16 over the transmission line 15. Once received, the data is decoded to provide data, clock and valid signals to the remote unit 26.

Figure 3:
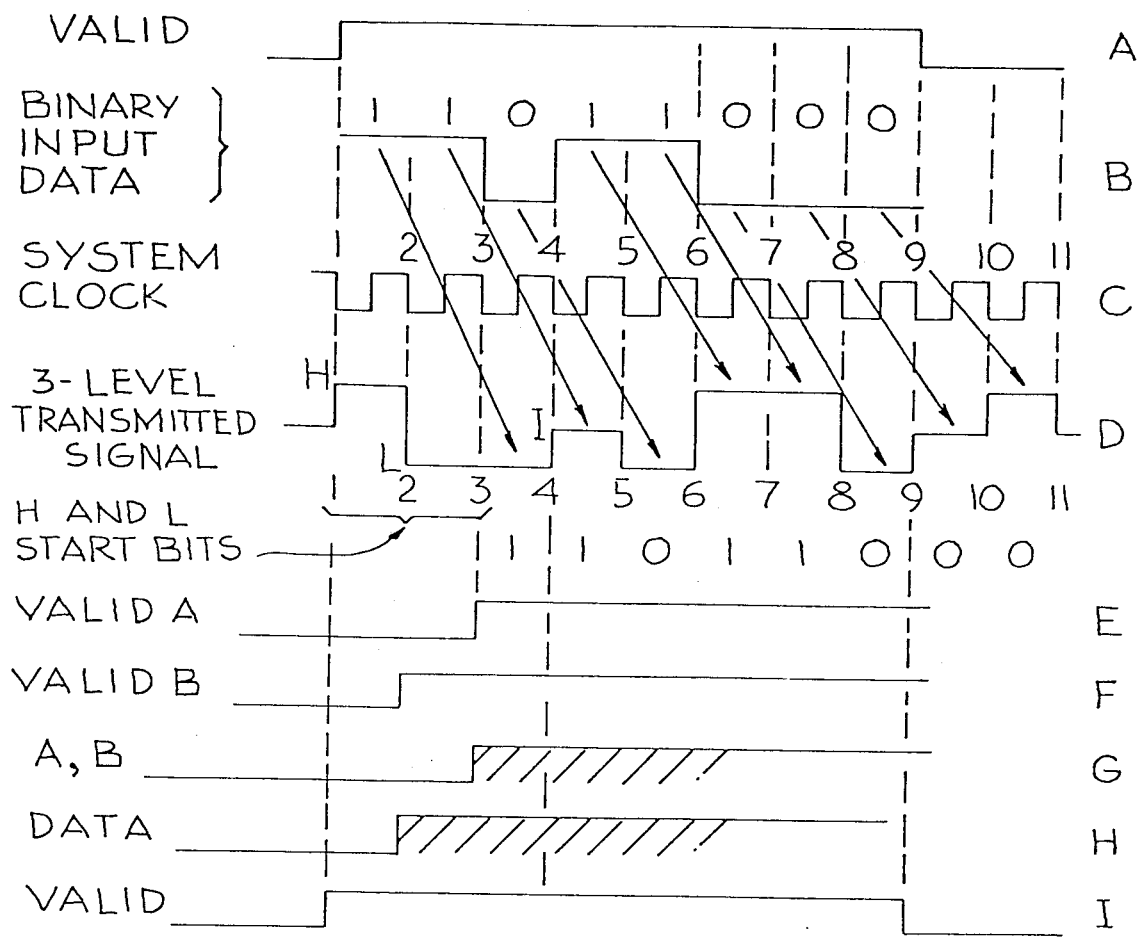
FIG. 3 is a series of idealized graphs illustrating a preferred manner of encoding binary data into a 3-level transmission signal in accordance with the invention.

The sequential binary input data signals to encoder circuitry 8 in FIG. 1 may typically have the waveshape illustrated in graph B of FIG. 3. A typical system clock is illustrated in graph C. A typical valid signal is illustrated in graph A. The significance of the valid signal is that when it is logically true, data is being applied to the data transmission system. When the valid signal is false, no data is being transmitted. In effect, therefore, the valid signal indicates the presence or absence of data for transmission and may thus also be referred to as a data presence signal. The waveshapes in FIG. 3 are illustrated in an idealized format since the detailed, actual rise and fall times are unnecessary to an understanding of the invention.

Figure 2A:
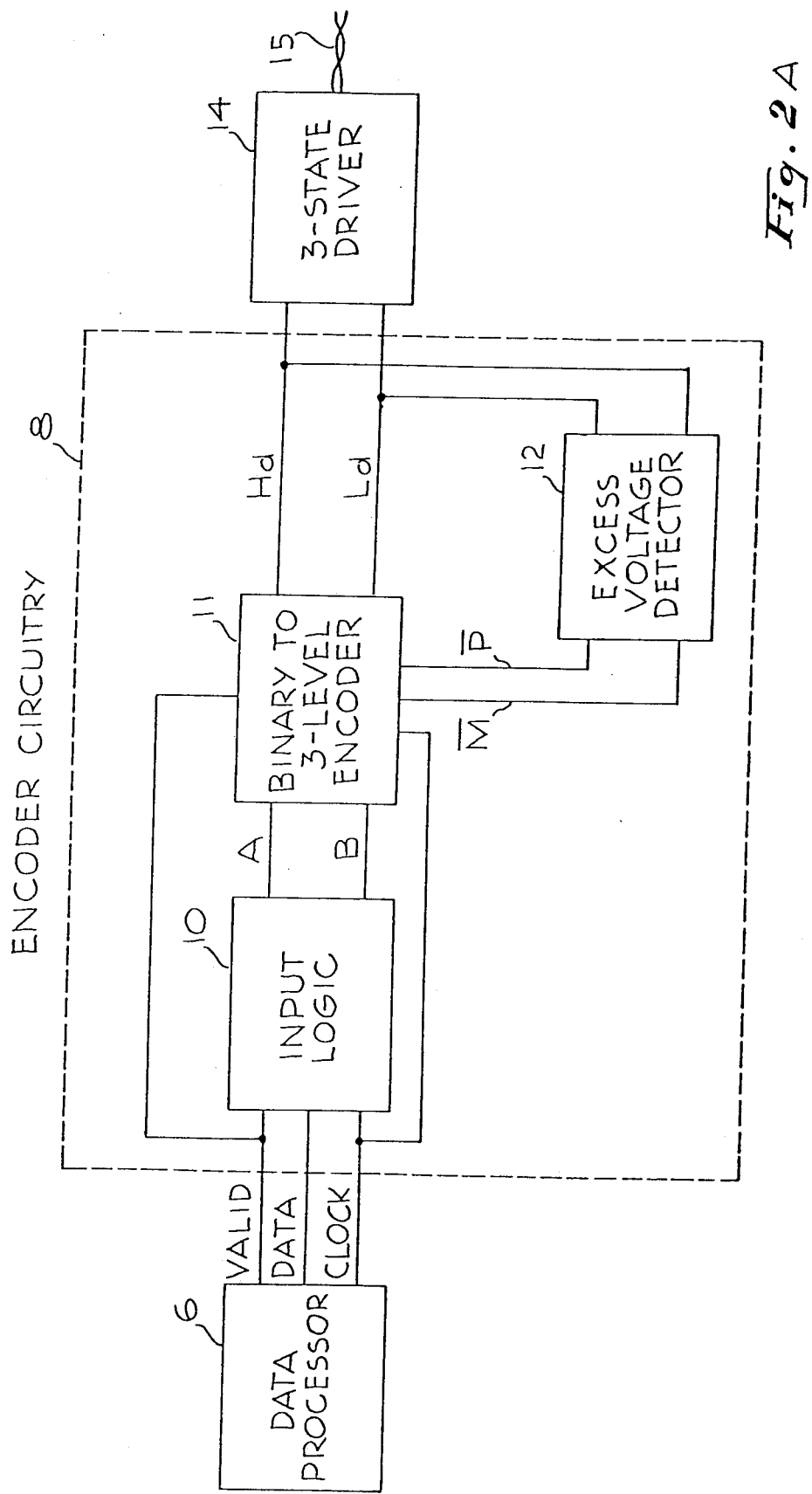
FIGS. 2a and 2b are more detailed block diagram of a preferred embodiment of a serial digital data transmission system illustrated in block form in FIG. 1.
Figure 2B:
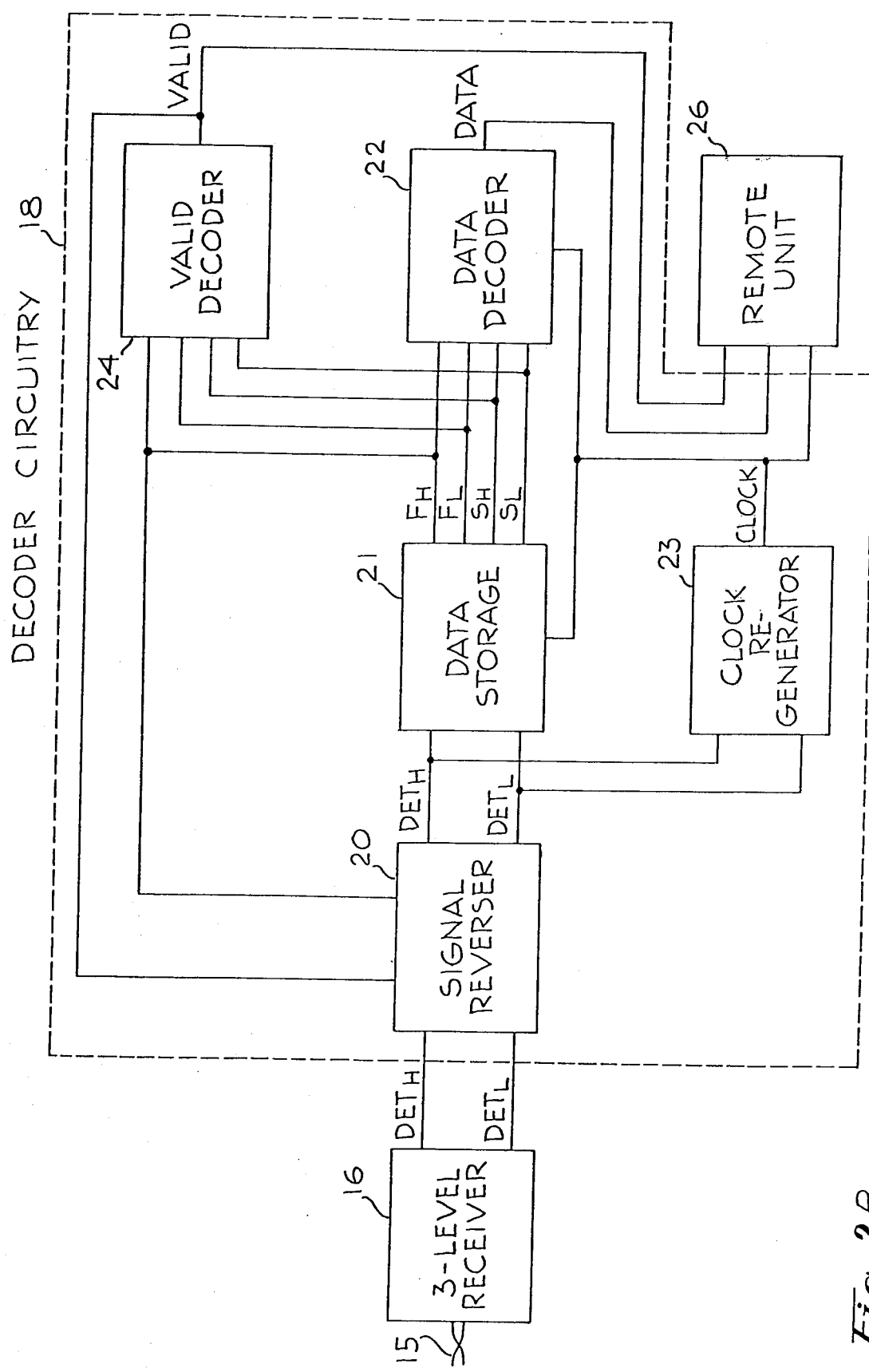

As illustrated in FIGS. 2a and 2b, the encoder circuitry 8 of FIG. 1 comprises an input logic 10, a binary to 3-level encoder 11 and an excess voltage detector 12. The data, clock and valid signals are first applied to input logic 10 for producing digital output signals A and B which are in turn applied to a binary to 3-level encoder 11. In the transmitter section the following definitions apply:

A: A signal level representative of the first bit of a digital bit pair to be transmitted, a bit pair comprising two sequential digital signal bits.
B: A signal level representative of the second bit of a bit pair to be transmitted, a bit pair comprising two sequential digital signal bits.
$H_d$: Logic output to high voltage driver
$L_d$: Logic output to low voltage driver
F: First transmitted signal level (either H or L)
S: Second transmitted signal level (either H or L)
P: Excess voltage detector output signal indicating that previous data transmitted has accumulated an excess of high level signals.
M: Excess voltage detector output signal indicating that previous data transmitted has accumulated an excess of low level signals.

Figure 4:
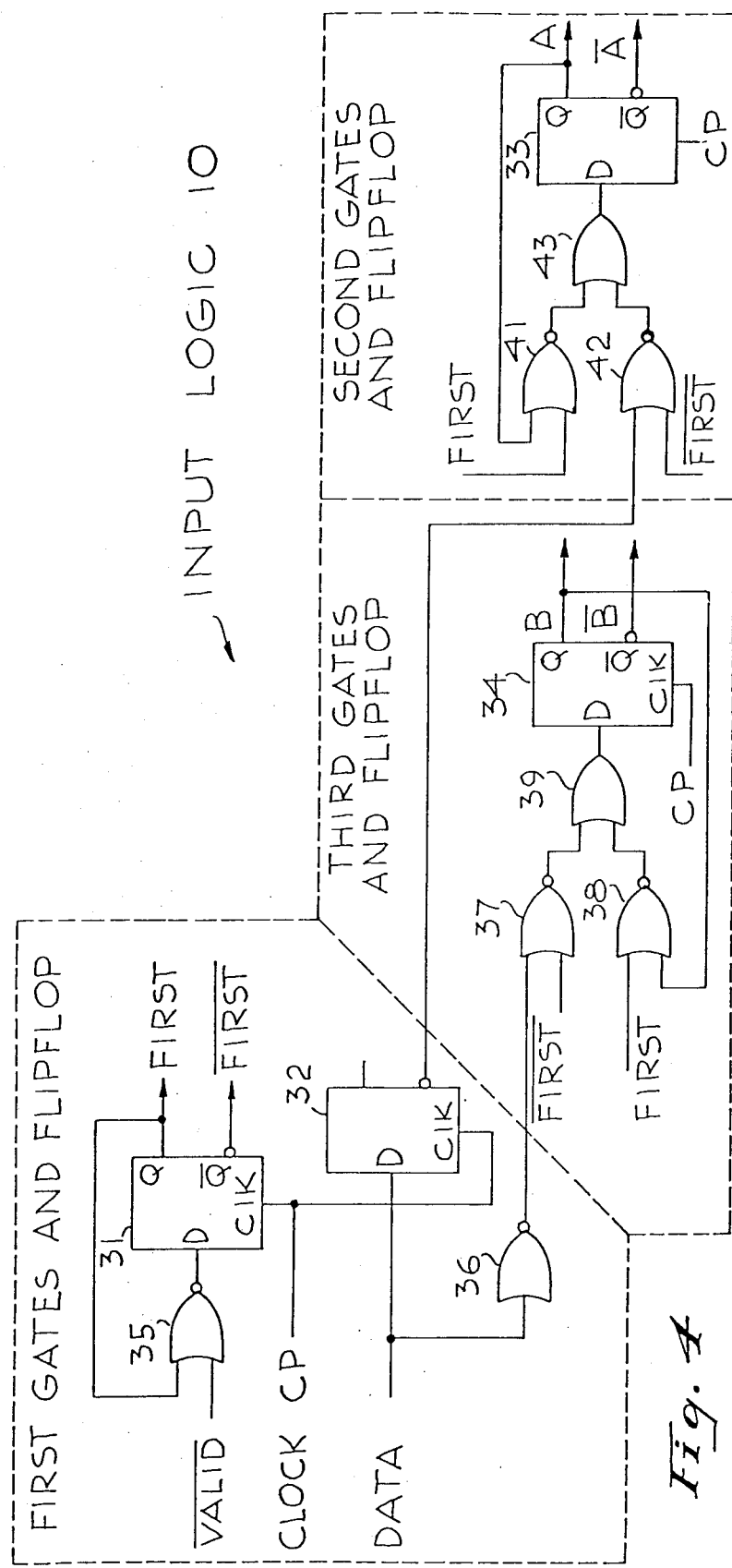
FIG. 4 is an electrical schematic diagram of a preferred embodiment of the input logic illustrated in block form in FIG. 2.

The 3-levels for encoding are high H, low L or intermediate I. The system clock and valid input signals are applied to the inputs of the binary to 3-level encoder 11 along with signals A and B. In response to the signals applied to it, the binary to 3-level encoder 11 produces output voltage levels $H_d$, $L_d$, $\overline{H_d}$, $\overline{L_d}$ which are applied to the inputs of an excess voltage detector 12. The resulting digital output signals $\overline{P}$ and $\overline{M}$ produced by the detector 12 are fed back and applied to the inputs of the binary to 3-level encoder 11. The binary to 3-level encoder 11 provides a means for encoding two sequential digital signal bits. The excess voltage detector provides excess signal polarity detection means. A perferred embodiment is illustrated in FIG. 4 for the input logic 10 and in FIG. 5 for the binary to 3-level encoder 11 and the excess voltage detector 12, and will be described in detail hereinafter.

In response to $H_d$ and $L_d$ inputs applied from the binary to 3-level encoder 11, the 3-state driver 14 transmits a 3-level signal output along a transmission line 15 as illustrated in graph D of FIG. 3. A 1, 0 combination for $H_d$, $L_d$ respectively produces a high H level signal. A 0, 1 combination for $H_d$, $L_d$ respectively produces a low L level signal. A 0, 0 combination for $H_d$, $L_d$ respectively produces an intermediate I level signal. The 3-level signal may be all positive with reference to a zero level, all negative with reference to a zero level, or may be positive and negative with reference to a zero level. The intermediate I level need not necessarily occur midway between high H and low L. The 3-state driver 14 typically has differential outputs and its operation is well known in the prior art. A driver for positive-going signals operating in conjunction with a separate driver for negative-going signals could be implemented to perform the function of the 3-state driver as is well known by those skilled in the art. The transmission line 15 is illustrated as a twisted pair. It is to be understood that the invention is not limited to driving any one type of line and lines such as a shielded twisted pair, a pair or a coaxial cable can be driven.

Figure 6:
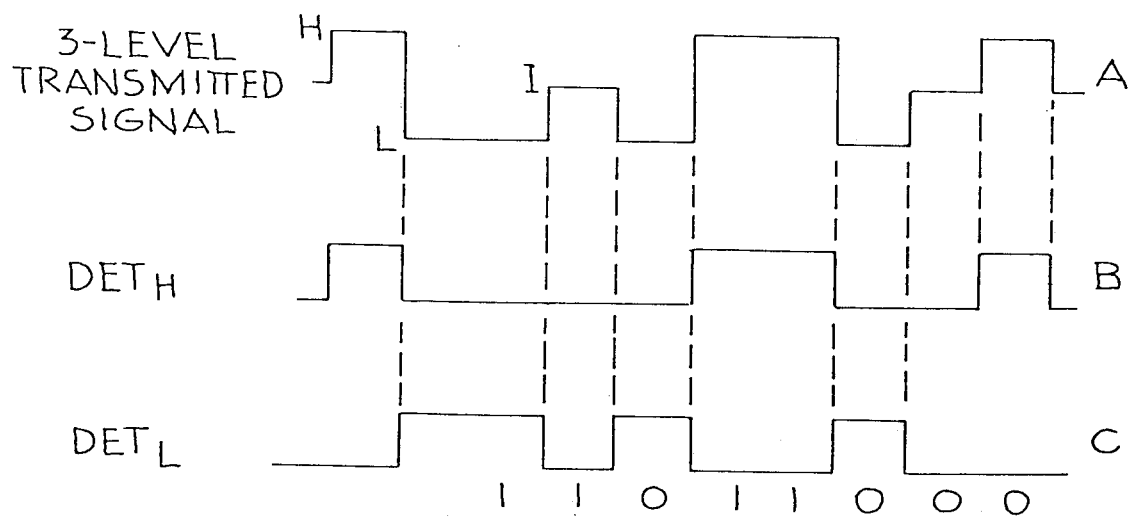
FIG. 6 is a series of idealized graphs illustrating a preferred manner of converting a 3-level transmission signal into a two level signal which includes a signal level on each of two lines in accordance with the invention.

Referring to FIGS. 2a and 2b, the decoder circuitry 18 further comprises a signal reverser 20, a data storage 21, a data decoder 22, a clock regenerator 23, and a valid decoder 24. An overall description of the 3-level receiver 16 and the decoder circuitry 18 is given below. At the receiving end of the transmission line 15 in FIG. 2, the received 3-level signal transmitted by the 3-state driver 14 is applied to the inputs of a 3-level receiver 16 which produces a two level signal which includes a signal level on each of two lines $Det_H$ and $Det_L$. A representative 3-level transmitted signal high H, low L and intermediate I is illustrated in FIG. 6, graph A, along with the resultant $Det_H$ and $Det_L$ signals illustrated in graphs B and C respectively. A high H level produces a 1, 0 for $Det_H$, $Det_L$ respectively. A low L level produces a 0, 1 for $Det_H$, $Det_L$ respectively. An intermediate I level produces a 0, 0 $Det_H$, $Det_L$ respectively. The signal illustrated in FIG. 6, graph A, is also shown in FIG. 3, graph D. The 3-level receiver 16 may also be considered as a 3-level detector with output signals of $Detector_H$ and $Detector_L$, or briefly $Det_H$ and $Det_L$.

The output signals $Det_H$ and $Det_L$ are applied to the inputs of a signal reverser 20, FIGS. 2a and 2b, for reversing the digital output signals if the transmission line 15 is reversed from its usual connection, thereby providing correct signal polarities to the further decoding circuits. The $Det_H$ and $Det_L$ signal outputs from the signal reverser 20 are applied to the inputs of a data storage 21 providing $F_H$, $F_L$, $S_H$, $S_L$ which are representative of the voltage levels of the transmitted data and are applied to the intputs of data decoder 22 which produces a signal to duplicate the original input signal received by the encoder circuitry 8.

The $Det_H$ and $Det_L$ signals produced by the signal reverser 20 are also applied to the inputs of a clock regenerator 23 which produces a regenerated clock CP representative of the clock signal originally received by encoder circuitry 8. Data only is transmitted on the transmission line 15 and the regenerated clock is derived from transitions in voltage levels of the 3- level signal transmitted as will be described in detail hereinafter.

Figure 7:
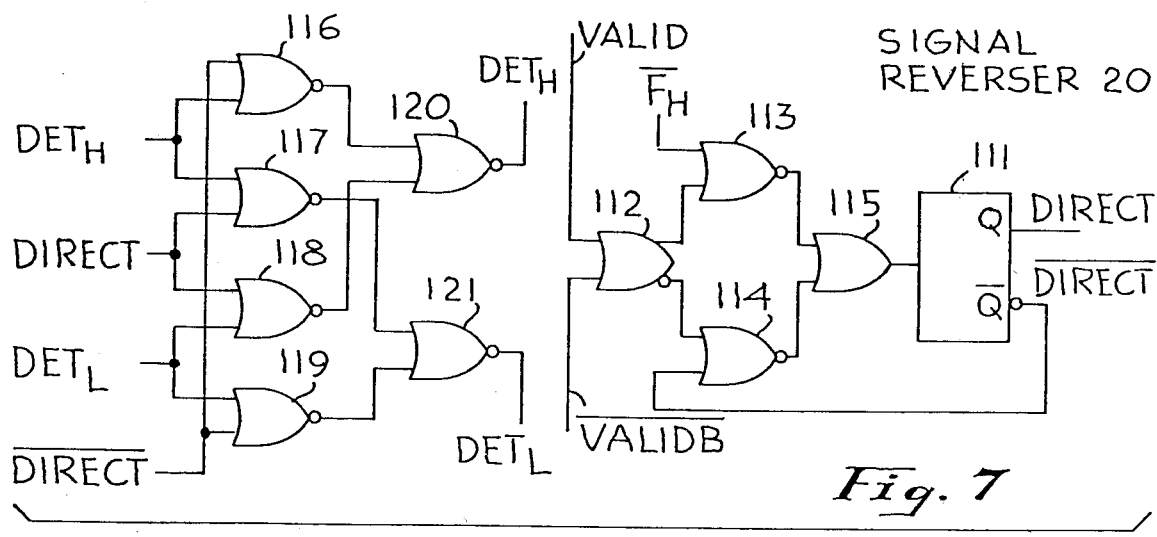
FIG. 7 is an electrical schematic diagram of a preferred embodiment of the signal reverser illustrated in block form in FIG. 2.

The $F_H$, $F_L$, $S_H$ and $S_L$ signals produced by the data storage 21 are applied to the inputs of a valid decoder 24 which produces a valid output signal. The valid signal is regenerated, as described in detail hereinafter, from decoding the data signals transmitted since data only is sent on the transmission line 15. The data, clock and valid signal outputs from the data decoder 22, clock regenerator 23 and valid decoder 24 respectively which are representative of the source data, clock and valid signals applied to the input of the transmitter section of the serial data transmission system are applied to the inputs of the remote unit 26 illustrated in FIGS. 2a and 2b. The $F_H$ signal produced by the data storage 21 and the valid signal produced by the valid decoder 24 are fed back and applied to the signal reverser 20 as indicated in FIGS. 2a and 2b. A preferred embodiment of the signal reverser 20 is illustrated in FIG. 7, the clock regenerator 23 in FIG. 8, the data storage 21 in FIG. 9, the data decoder 22 in FIG. 10, and the valid decoder 24 in FIG. 11.

Reference is now directed to FIG. 4 which illustrates a preferred embodiment of the input logic 10 shown in block form in FIG. 2. As shown, the input logic 10 comprises a plurality of D-type flip-flops 31–34 operating in conjunction with a plurality of NOR gates 35–38 and 41–42 together with a plurality of OR gates 39 and 43 to provide storage for signal level A and signal level B. The Q output of flip-flop 33, A, represents the first bit of two sequential digital signal bits to be transmitted. The Q output of flip-flop 34, B, represents the second bit of two sequential digital signal bits to be transmitted. The input logic 10 is divided into first gates and flip-flop means, second gates and flip-flop means and third gates and flip-flop means as illustrated by the boundary lines drawn in FIG. 4. The system clock CP is applied to the clock input of D-type flip-flop 31. The complement of the system $\overline{\text{valid}}$ signal, valid, is applied to an input of NOR gate 35, the Q output of flip-flop 31 is applied to another NOR gate 35 input. The output of NOR gate 35 is applied to the D input of flip-flop 31 so as to produce a Q output designated First and a $\overline{Q}$ output designated $\overline{\text{First}}$. The resulting $\overline{Q}$ output signal produced by flip-flop 32 in response to the system clock input CP applied to the clock input and the system data applied to the D input is applied to a NOR gate 42. A second input $\overline{\text{First}}$ is applied to NOR gate 42. First is applied to an input of NOR gate 41 and the Q output of flip-flop 33, A, is applied to another input of NOR gate 41. The resulting output signal produced by OR gate 43 in response to inputs applied from the outputs of NOR gates 41 and 42 is applied to the D input of flip-flop 33 which operates in conjunction with CP applied to the clock input of flip-flop 33 to produce A at the Q output and $\overline{A}$ at the $\overline{Q}$ output. The resulting output produced by NOR gate 36 in response to the system data input is applied to an input of NOR gate 37 along with $\overline{\text{First}}$ being applied to another input of NOR gate 37. The First signal is applied to an input of NOR gate 38 and the Q output of flip-flop 34, B, is applied to another input of NOR gate 38. The resulting output signal produced by OR gate 39 in response to inputs applied from the outputs of NOR gates 37 and 38 is applied to the D input of flip-flop 34 having CP applied to its clock input to produce B at the Q output and $\overline{B}$ at the $\overline{Q}$ output.

The input logic 10 function is described below. Flip-flop 31 operates effectively as an inverter wherein inversion occurs upon the application of each clock, CP. Before data transmission begins, $\overline{\text{valid}}$ is true, First is false. When data transmission begins and is applied to the input logic 10, $\overline{\text{valid}}$ goes true and valid goes false for the remainder of the stream of data transmission. First goes true 1 clock after valid goes true, that is on the first clock. First alternates true and false with the application of each clock, CP. First is true on clock 1, false on clock 2, true on clock 3, false on clock 4 and so on. When valid goes false signifying the end of data transmission, First locks up false. Upon the application of data to the input of the input logic 10, when First is true, the data entering flip-flop 32 is A of the bit pair. When First is false, the data entering flip-flop 32 is B of the bit pair. Thus, the objective of the First and $\overline{\text{First}}$ signal outputs of flip-flop 31 is to divide the data stream into bit pairs A and B for storage in flip-flops 33 and 34 respectively.

Figure 5:
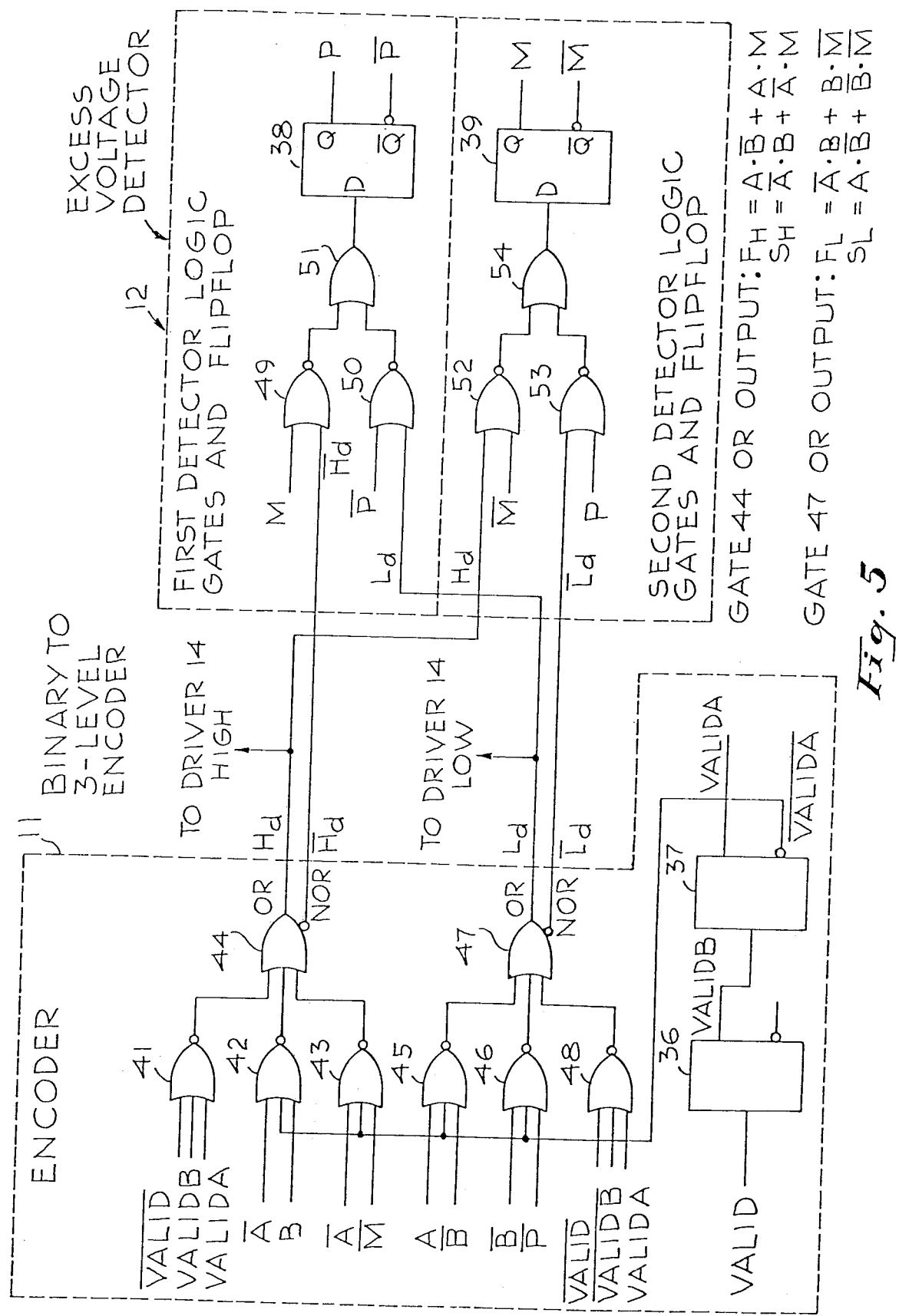
FIG. 5 is an electrical schematic diagram of a preferred embodiment of the binary to 3-level encoder and the excess voltage detector illustrated in block form in FIG. 2.

In the above-described manner the storage of 2 bits of data, A and B, is accomplished for application to the inputs of the binary to 3-level encoder 11, a preferred embodiment of which is illustrated in FIG. 5 along with a preferred embodiment of the excess voltage detector 12 which are described next.

Table I indicates a 2-bit coding method used in a preferred embodiment of encoder circuitry 8.

TABLE I

| digital signal bits A | B | transmitted voltage levels |
|---|---|---|
| 0 | 0 | IH or IL |
| 0 | 1 | LH |
| 1 | 0 | HL |
| 1 | 1 | HI or LI |

It can be seen that two (00 and 11) of the four bit combinations have two codes each by which they may be represented. Also note that, in each case, one code has a high average signal and the other has a low average signal. The accumulated polarity of the transmitted voltage levels is detected as to whether the prior accumulated signal levels averaged out to either an excess of high level signals, an excess of low level signals or an intermediate level signal. A choice is made as to which code to transmit next so as to continually seek maintenance of the intermediate level on the transmission line 15. The other two (01 and 10) of the four bit combinations each have only one representation, each of which averages to the intermediate level, thus making a choice unnecessary in these cases.

The resultant digital outputs of the binary to 3-level encoder 11 are representable by the following Boolean encoding equations:

$$F_H = A \cdot B \cdot M + A \cdot \overline{B} = A \cdot \overline{B} + A \cdot M \quad (1)$$

$$F_L = A \cdot B \cdot \overline{M} + \overline{A} \cdot B = \overline{A} \cdot B + B \cdot \overline{M} \quad (2)$$

$$S_H = \overline{A} \cdot \overline{B} \cdot M + \overline{A} \cdot B = \overline{A} \cdot B + \overline{A} \cdot M \quad (3)$$

$$S_L = \overline{A} \cdot \overline{B} \cdot \overline{M} + A \cdot \overline{B} = A \cdot \overline{B} + \overline{B} \cdot \overline{M} \quad (4)$$

The logic in the first two equations (1) and (2) above, for $F_H$ and $F_L$, is performed in 6 logic gates 42–47 of FIG. 5. Since the second two equations (3) and (4) above are identical to the first two with only A and B logically inverted, the entire logic is performed by using flip-flops 33 and 34 of FIG. 2 to Store A and B respectively which is then toggled (inverted) after the first clock to provide the correct decoding for the second transmitted voltage level.

A 1, 0 combination for $F_H$, $F_L$ respectively produces a high H level signal. A 0, 1 combination for $F_H$, $F_L$ respectively produces a low L level signal. A 0, 0 combination for $F_H$, $F_L$ respectively produces an intermediate I level signal. The logic for $F_H$ and $F_L$ applies similarly for $S_H$ and $S_L$.

A pair of flip-flops 38 and 39 in the excess voltage detector 12 of FIG. 5 is provided to keep track of the accumulation of the levels of previously transmitted signals. The accumulation has three possible states; namely, the signal levels averaged out to an excess of high level signals (M=false, P=true), an excess of low level signals (M=true, P=false) or an intermediate level signal (M=false, P=false). The logic is implemented so that if M is false, P is assumed true so that the next transmitted voltage levels are selected by the binary to 3-level encoder 11 for a low average whether the prior signal levels averaged an excess of a high level signal or an intermediate level signal. Excess signal polarity information is conveyed from outputs of the excess voltage detector 12 to inputs of the binary to 3-level encoder 11.

The logical encoding equations (1)–(4) above are implemented by the binary to 3-level encoder 11 of FIG. 5 which comprises D-type flip-flops 36 and 37, NOR gates 41, 42, 43, 45, 46, and 48, and OR/NOR gates 44 and 47. The encoder 11 outlined by boundary lines in FIG. 5 provides means for encoding two sequential digital signal bits into signal levels on two lines designated $H_d$, $L_d$ and the logical complements $\overline{H_d}$, $\overline{L_d}$ respectively are also provided. The signals valid A, $\overline{A}$, B and $\overline{M}$ are applied to the logic group comprising NOR gates 42, 43 and OR/NOR gate 44 to activate the high $H_d$ line to 3-state driver 14. At the appropriate clocks, gates 42–44 implement encoding equations (1) and (3) above and apply the logic of equations (1) and (3) to the OR output of gate 44 activating the $H_d$ line to driver 14.

The signals $\overline{\text{valid A}}$, A, $\overline{B}$ and $\overline{P}$ are applied to the logic group comprising NOR gates 45, 46 and OR/NOR gate 47 to activate the $L_d$ line to the 3-state driver 14. At the appropriate clocks, gates 45–47 implement encoding equations (2) and (4) above and apply the logic of equations (2) and (4) to the OR output of gate 47 activating the $L_d$ line to driver 14. As explained earlier, the logic combination of $H_d$ and $L_d$ determines the level to be transmitted as illustrated in FIG. 3, graph D.

One feature of the preferred embodiment of the invention is that data transmission need not be continuous. It may be started and stopped and therefore provision is made for the use of a pair of start bits when transmission is started after a rest period to prevent the first transmitted voltage level from being intermediate I which would not be detected. Referring to FIG. 5, when valid is false and even after it has been true for 2 clocks, gates 42–43, 45–46 are de-activated. For the first 2 clocks after valid goes true, gates 41 and 48 are activated. On the first clock, gates 41 and 48 cause the driver 14 to produce a high H transmitted voltage level. On the second clock, gates 41 and 48 cause a low L signal to be transmitted. These two H and L signals are the start bits illustrated in FIG. 3, graph D clocks 1 and 2 respectively, indicating the start of data transmission. The system clock is illustrated in FIG. 3, graph C, and valid is illustrated in graph A. After the first two clocks after valid goes true, gates 42–43, 45–46 are activated and gates 41 and 48 are de-activated for the remainder of the data transmission.

Referring to FIG. 5, the excess voltage detector 12 comprises D-type flip-flops 38 and 39, NOR gates 49, 50, 52, 53, and OR gates 51 and 54. The signals M, $\overline{P}$, the NOR output of gate 44 $\overline{H_d}$ and the OR output of gate 47 $L_d$ are applied to the inputs of logic group 49–51 to provide input to flip-flop 38 having outputs P and $\overline{P}$. The signals $\overline{M}$, P, the OR output of gate 44 $H_d$ and the NOR output of gate 47 $\overline{L_d}$ are applied to the inputs of logic group 52–54 to provide an input to flip-flop 39 having outputs M and $\overline{M}$. Boundary lines drawn in FIG. 5 outline first detector logic gates and flip-flop means and second detector logic gates and flip-flop means providing P, $\overline{P}$ and M, $\overline{M}$ outputs respectively of detector 12.

Referring to FIGS. 3, 4 and 5 the sequential operation of the input logic 10, the binary to 3-level encoder 11, the excess voltage detector 12 and the 3-state driver 14 is as follows. After valid goes true, two start bits high H and low L are generated on clocks 1 and 2. At clock 3, load the bit pair, A and B, in flip-flops 33 and 34 respectively and drive the first state of the transmitted voltage level to driver 14. At clock 4, invert the logic states of bit pair A and B on flip-flops 33 and 34 respectively and drive the second state of the transmitted voltage level to driver 14. The operations performed during clock 3 are repeated at clock times 5, 7, 9 and so on. The operations performed during clock 4 are repeated at clock times 6, 8, 10 and so on. FIG. 3, graph B, shows a string of binary input data 11011000 for illustrative purposes. Graph D illustrates the corresponding 3-level transmitted signal for this string of data preceded by the start bits occurring during the first two clocks followed by the first data signal level transmission at clock 3, the second data signal level transmission at clock 4 and so on. Graphs A–I of FIG. 3 illustrate the typical waveshapes and timing relationships existing between the signals pertinent to the operation described above for the transmitter section of the invention, wherein graphs A–D have been previously described. Referring to FIG. 3, graph I represents the valid signal as also illustrated in graph A. Graph H illustrates a string a sequential binary input data signals into the transmission system. Valid B, illustrated in graph F, goes true 1 clock time after valid goes true. Valid A, shown in graph E, goes true 1 clock time after valid B goes true. Graph G illustrates the fact that the digital bit pair A and B appear at the outputs of flip-flops 33 and 34 respectively two clock times after valid goes true.

The preferred embodiment disclosed herein is capable of transmitting high frequency signals over long distances. High frequency transmissions over long distances usually require isolation by some means, one practical means being a transformer which cannot pass signals with DC components. The preferred embodiment permits the use of transformer coupling, but direct coupling without transformers can also be implemented in accordance with the invention. If transformer coupling is employed, the high H and low L signal levels are made symmetrical above and below a zero intermediate level.

Since the performance of this communication method depends on utilizing three distinct signal levels on the transmission line, the phasing of the line is important. In some applications it is preferred to make the connecting wire symmetrical, in which case the two signals may or may not be swapped when the system is connected. However, since this transmission method uses a pair of start bits when transmission is started after a rest period, the start bits can be predetermined and used at the receiver to decide whether or not the wires are swapped. If they are, then the signals can be logically swapped after the two start bits. The circuitry to perform this function is shown in FIG. 7 for the signal reverser 20 which will next be described.

The initial bit latch section of the reverser 20 comprises D-type flip-flop 111, OR/NOR gate 112, NOR gates 113, 114 and OR gate 115. The section of the reverser 20 which actually reverses the signals, if required, comprises the NOR gates 116–121. When data transmission starts, the first pair of bits get through the reverser 20 to produce $Det_H$ and $Det_L$ and subsequently $F_H$, $F_L$, $S_H$ and $S_L$. At the start, both valid and $\overline{\text{valid B}}$ will be false, the Direct signal on the Q output of flip-flop 111 will be $F_H$ and will latch that way as a result of the valid and $\overline{\text{valid B}}$ inputs to gate 112 both being false in conjunction with the $\overline{F_H}$ input to gate 113.

If the transmission wires 15 are not reversed, the start bits are high H and low L, $F_H$ is true and the Direct signal output of flip-flop 111 is true. The $Det_H$ signal input to gates 116, 117 is then connected through gates 116 and 120 to the $Det_H$ output of reverser 20. The $Det_L$ input to gates 118 and 119 is connected through gates 119 and 121 to the $Det_L$ output of reverser 20.

On the other hand, if the transmission wires 15 are in fact reversed, the start bits appear as low L and high H, $F_H$ is false and the Direct signal output of flip-flop 111 is false. The $Det_H$ signal input to gates 116, 117 is then connected through gates 117 and 121 to the $Det_L$ output of reverser 20. The $Det_L$ input to gates 118 and 119 is connected through gates 118 and 120 to the $Det_H$ output. The signal reverser 20 functioning, in effect, as an electronic double pole, double throw switch thereby automatically provides correction if the transmission line 15 is reversed from its usual connection and provides correct signal polarities to the further decoding circuits.

Figure 8:
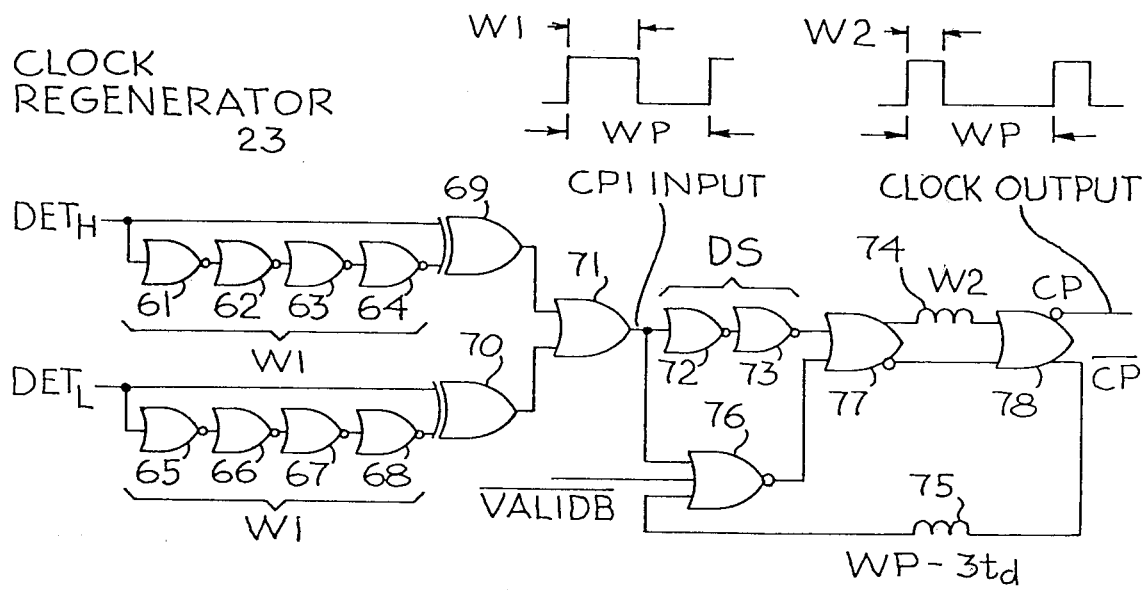
FIG. 8 is an electrical schematic diagram of a preferred embodiment of the clock regenerator illustrated in block form in FIG. 2.

Reference is next directed to FIG. 8 which illustrates a particularly advantageous embodiment of the clock regenerator 23 shown in block form in FIG. 2. More specifically the clock regenerator 23 comprises NOR gates 61-68, 72, 73 and 76, OR gate 71, Exclusive OR gates 69 and 70, OR/NOR gates 77 and 78 and delay elements 74 and 75. The data is transmitted on line 15 with only one transition per bit and the clock is imbedded in the data in the form of the data transitions so that a second transmission medium need not be included to transmit the system clock. Data in the form of $Det_H$ and $Det_L$ is applied from the outputs of the signal reverser 20 to the clock regenerator 23 inputs of Exclusive OR gates 69 and 70 respectively. Gates 61-71 are designed as a standard edge detector circuit. A transition on $Det_H$ input to gate 69 produces a pulse CP1 at the output of gate 71 of a width equal to the delay contributed by gates 61-64 connected to a second input of gate 69. Similarly, a transition on $Det_L$ input to gate 70 produces a pulse CP1 at the output of gate 71 equal to the width of the delay contributed by gates 65-68 connected to a second input of gate 70. The delay of gates 61-64 is shown as W1 in FIG. 8 and is designed to be substantially equal to the delay of gates 65-68. In the above-described manner, CP1 represents one clock for each transition of data. The width of CP1 is shown as W1 and the data transmission rate is illustrated as WP.

The remaining elements 72-78 of the clock regenerator 23 are included to shape the clock pulses and to provide clocks which may be missing in CP1 during transmission of data when two successive bit times may have no transition. Referring to FIG. 3, graph D, for example, there are no transitions at clock times 3 and 7 for the particular data bit combinations illustrated and so at these times CP1 does not adequately reconstruct the clock. The circuit of elements 72-78 is provided to add the missing clocks. The CP1 pulses out of gate 71 are applied to the input of gate 77 through delay D3 comprising gates 72 and 73 to produce a pulse output from gate 77. Gates 77, 78 and delay element 74 form a positive edge detector. In response to the positive edge of CP1 applied to gate 78, a pulse width of W2 equal to the delay of element 74 is created out of gate 78. The OR output of gate 78 $\overline{CP}$ is fed back to gate 76 input through delay element 75. If another pulse does not appear at the data rate, WP, the previous pulse will propagate through delay 75 to gate 76 wherein the CP1 input and $\overline{valid\ B}$ input will each be false. The fed back signal will go through gate 76 and at gate 77 input it substitutes for the missing clock and creates a clock pulse out of gate 78 NOR output as described above. $\overline{Valid\ B}$ input to gate 76 insures that missing clocks will be created only during data transmission. Delay 75 is substantially matched to the data transmission rate of the system wherein WP equals the system clock or data rate, td equals the propagation time delay through one gate, and 3td equals the delay through the 3 gates 76-78. The delay 75 having a delay time WP—3td provides the missing clock at the correct clock rate and not 3td later. The delay 74 is selected to shape the clock pulses to the width, W2.

Figure 9:
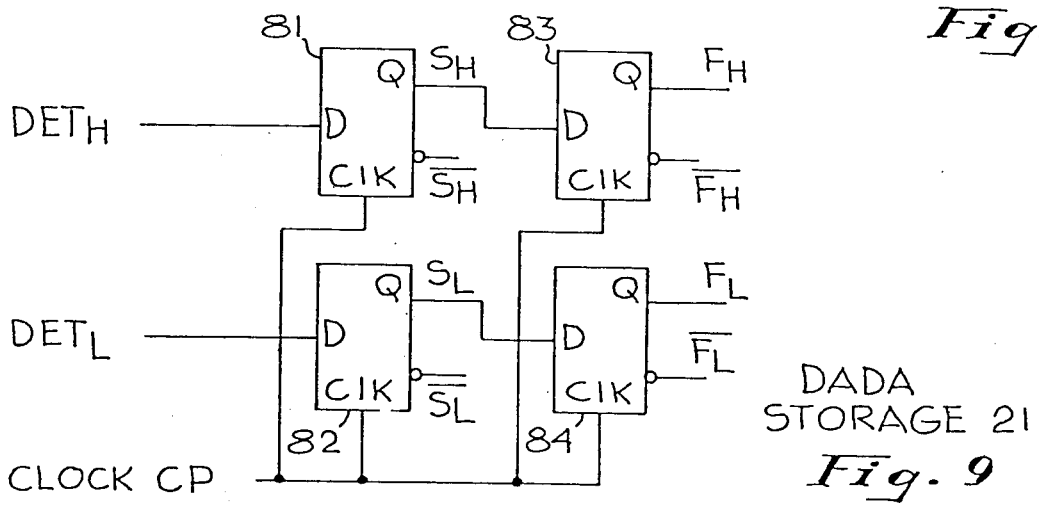
FIG. 9 is an electrical schematic diagram of a preferred embodiment of the data storage illustrated in block form in FIG. 2.

Referring next to FIG. 9 is a preferred embodiment of the data storage 21 illustrated in block form in FIGS. 2a and 2b. The storage 21 comprises four D-type flip-flops 81-84. In response to clock CP applied to flip-flops 81-84 and $Det_H$ and $Det_L$ applied to flip-flops 81 and 82 respectively, the Q outputs of flip-flops 83, 84, 81 and 82 provide storage of the transmitted levels $F_H$, $F_L$, $S_H$, $S_L$ respectively. Since a 2-bit coding method is used in the preferred embodiment, the object of storage 21 is to store the F and S levels for 2 clock times and provide output of these levels to the data decoder 22 and the valid decoder 24 described hereinafter.

Figure 10:
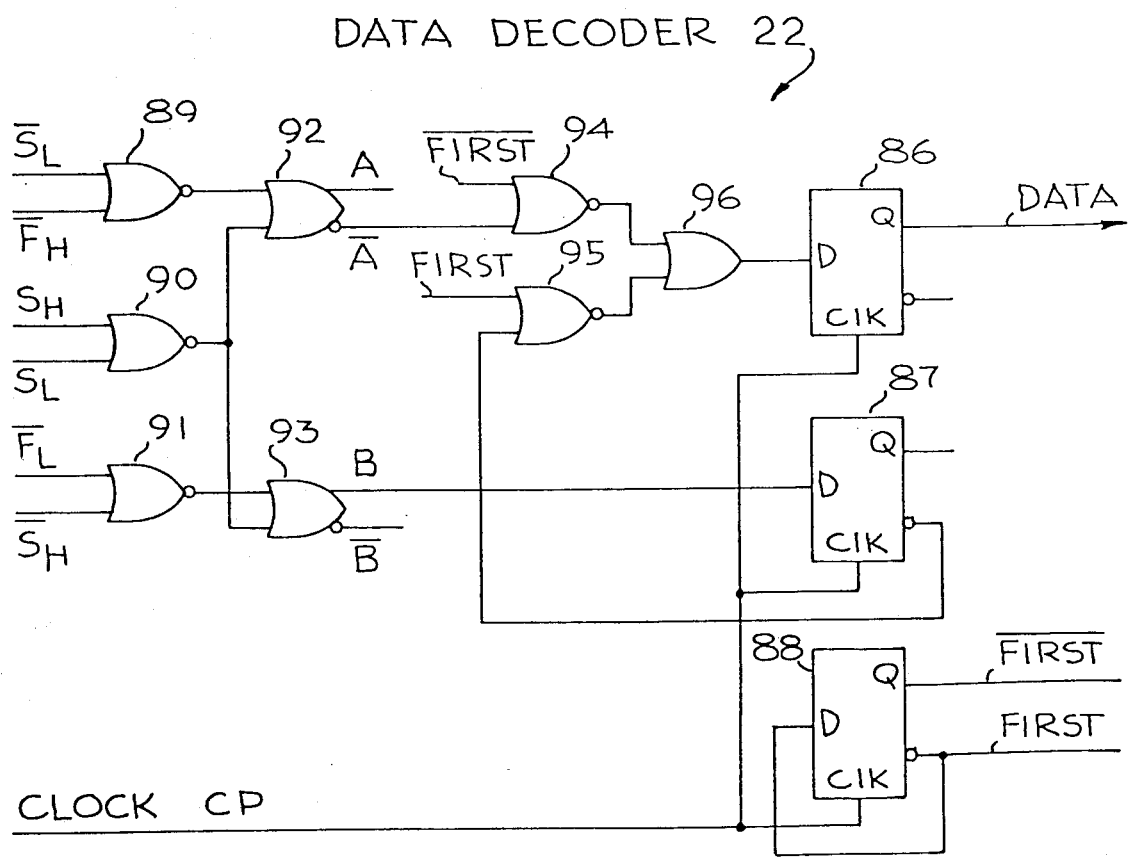
FIG. 10 is an electrical schematic diagram of a preferred embodiment of the data decoder illustrated in block form in FIG. 2.

A preferred embodiment of the data decoder 22 is illustrated in detail in FIG. 10 and in blockform in FIGS. 2a and 2b. The decoder 22 comprises flip-flops 86-88, NOR gates 89-91 and 94-95, OR gate 96 and OR/NOR gates 92 and 93. Data is provided to remote unit 26 from the Q output of flip-flop 86 in response to combinations of 2-level signals F and S applied to the inputs of gates 89-91 provided from the outputs of data storage 21. Data is produced from the output of flip-flop 86 in response to the clock pulses applied to the clock inputs of flip-flops 86-88 provided from the output of the clock regenerator 23. The output of flip-flop 88 is applied to the inputs of gates 94 and 95 in response to whether the first or the second of two data signal levels is being decoded at the time. The decoder 22 provides digital output data responsive to the 2-level signals applied to decoder 22 inputs in accordance with the following Boolean decoding equations:

$$A = F_H \cdot S_L + \overline{S_H} \cdot \overline{S_L} \tag{5}$$

$$B = F_L \cdot S_H + \overline{S_H} \cdot \overline{S_L} \tag{6}$$

The basis for the decoding equations (5) and (6) is derived from a closer examination of the 2-bit encoding method described above in Table I.

It is understood that the transmitted voltage levels in the preferred embodiment do not employ the codes II, LL or HH. No transmission is indicated by II. The codes LL or HH involving no transition between data bits are not used in the encoding method. The only time the second transmitted voltage level is I is when A and B are both true. The decoding equation (5) above satisfies the three possible states when A is true; namely, HL, HI and LI. The decoding (6) above satisfies the three possible states when B is true; namely, LH, HI and LI. The expression $\overline{S_H} \cdot \overline{S_L}$ employed in equations (5) and (6) above is understood to mean that the second transmitted level is intermediate I. The first bit of the two sequential digital signal bits, A, appears at the output of gate 92 as a result of the logic performed on the F and S inputs to gates 89 and 90. The data output representative of the frst bit, A, appears as an output of flip-flop 86 as a result of the logic performed by gates 94 and 96 in response to the input to gate 94 from the output of gate 92. The second bit of the two sequential digital signal bits, B, appears at the output of gate 93 as a result of the logic performed on the F and S inputs to gates 90 and 91. The data output representative of the second bit, B, appears as an output of flip-flop 86 as a result of logic performed by gates 95 and 96, the output of flip-flop 87 being applied to the input of gate 95 in response to the B output from gate 93.

Figure 11:
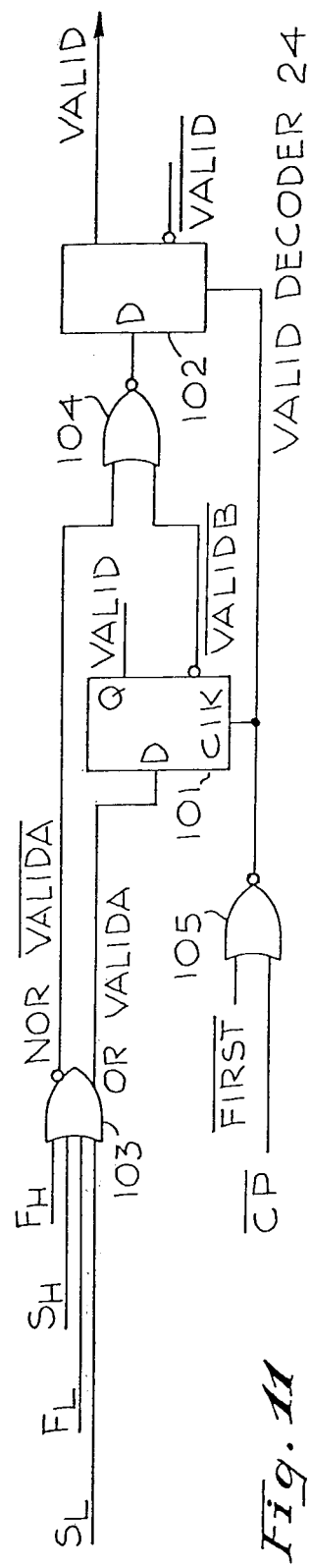
FIG. 11 is an electrical schematic diagram of a preferred embodiment of the valid decoder illustrated in block form in FIG. 2.

Attention is next directed to the valid decoder 24 illustrated in detail in FIG. 11 and shown in block form in FIGS. 2a and 2b. The function of the valid decoder 24 is to regenerate the valid signal from the data transmitted over line 15. The valid decoder 24 comprises flip-flops 101 and 102, OR/NOR gate 103 and NOR gates 104 and 105. The 2-level signal outputs of data storage 21, $F_H$, $F_L$, $S_H$, $S_L$, are applied to the inputs of gate 103, the outputs of which are applied to gate 104 input and flip-flop 101 input. The valid output of flip-flop 102 is produced in response to the gate 104 output applied to the input of flip-flop 102. The output produced by gate 104 is in response to the inputs to gate 104 from OR/NOR gate 103 and flip-flop 101. Clock inputs to flip-flops 101 and 102 are provided from the output of gate 105 in response to the $\overline{First}$ and $\overline{CP}$ inputs applied to gate 105. It is to be understood that if any F or S input goes true, the valid A output on the gate 103 OR line will go true. After one clock valid B output from flip-flop 101 will go true. After one more clock, the valid output of flip-flop 102 will go true. Valid will remain true until transmission over the system stops, at which time all inputs to gate 103 will go false and valid signal out of flip-flop 102 will go false.

It is to be understood that the present invention is subject to many modifications and variations in construction, arrangement and use without departing from the scope of the invention. Accordingly, the present invention is to be considered as including all possible modifications and variations coming within the scope of the invention as defined by the appended claims.

What is claimed is:

1. A self-clocked three-level digital data transmission system comprising:

encoding means responsive to input binary signals and an applied clock signal for encoding said input binary signals into a three-level signal having first and second levels and an intermediate level and having level transitions occurring at times determined by said clock signal;

said encoding means being operable to encode pairs of input binary signals into corresponding encoded pairs of sequential levels in a manner such that at least one encoded input pair is selectably encodable into either a first pair of sequential levels having a positive average value relative to said intermediate level or into a second pair of sequential levels having a negative average value relative to said intermediate level, said encoding means being operable to select said first or second pair in a manner so as to seek a predetermined average level for the encoded three-level signal relative to said intermediate level;

a transmission line;

driving means for coupling the encoded three-level signal to one end of said transmission line for transmission thereby; and receiving and decoding means coupled to the other end of said transmission line for receiving the transmitted three-level signal, deriving said clock signal therefrom, and employing the derived clock signal for decoding the received three-level signal into binary form.

2. The invention in accordance with claim 1, wherein said first and second levels are equal and of opposite polarity relative to said intermediate level.

3. The invention in accordance with claim 1, wherein said intermediate average level is substantially zero.

4. The invention in accordance with claim 1, 2 or 3, wherein a valid signal is applied to said encoding means along with said input binary signals for indicating the presence thereof, wherein said encoding means operates to provide encoding only when said valid signal is applied, and wherein said receiving and decoding means includes means for regenerating said valid signal from the received three-level signal.

5. The invention in accordance with claim 4, wherein said input binary signals applied to said encoding means include a plurality of start bits, and wherein said receiving and decoding means include means for detecting said start bits for use in determining the polarity of the received three-level signal.

6. The invention in accordance with claim 4, wherein said three-level signal is comprised of a high level H, a low level L and an intermediate level I, and wherein said encoding means is operable to encode an input pair into a pair of encoded levels as follows:

| INPUT PAIR | ENCODED PAIR |
|---|---|
| 00 | IH or IL |
| 01 | LH |
| 10 | HL |
| 11 | HI or LI |

7. The invention in accordance with claim 6, wherein said encoding means selects between the encoded pair IH and IL for a 00 input pair and between the encoded pair HI and LI for a 11 input pair in response to detecting the accumulated average level of the encoded three-level signal.

8. The invention in accordance with claim 4, wherein said encoding means operates in response to an input pair designatable as AB to produce an encoded pair designatable as FS in accordance with the following Boolean equations:

$$F_H = A \cdot \overline{B} + A \cdot M$$

$$F_L = \overline{A} \cdot B + B \cdot \overline{M}$$

$$S_H = \overline{A} \cdot B + \overline{A} \cdot M$$

$$S_L = A \cdot \overline{B} + \overline{B} \cdot M$$

wherein M is true when the encoded signal has an average level which is between L and I; wherein the $F_H$ and $F_S$ equations set forth the relationships which determine whether the first encoded level F of an encoded pair will have an H or L level, and wherein the $S_H$ and $S_L$ equations set forth the relationships which determine whether the second encoded level S of a transmitted pair will have an H or L level, an I encoded level being produced when the respective equations above are inapplicable.

* * * * *

UNITED STATES PATENT AND TRADEMARK OFFICE
CERTIFICATE OF CORRECTION

PATENT NO.   :   4,271,526
DATED        :   June 2, 1981
INVENTOR(S)  :   Laurence P. Flora It is certified that error appears in the above—identified patent and that said Letters Patent is hereby corrected as shown below:

Col. 2, line 51, after "receiver" insert --section--.
Col. 5, line 50, change "valid" to --valid--,
                 change "valid" to --valid--.
Col. 8, line 22, change "a", second occurrence, to --of--.

Signed and Sealed this

Eleventh Day of August 1981

[SEAL]

Attest:

Attesting Officer

GERALD J. MOSSINGHOFF
Commissioner of Patents and Trademarks